Figure 1:
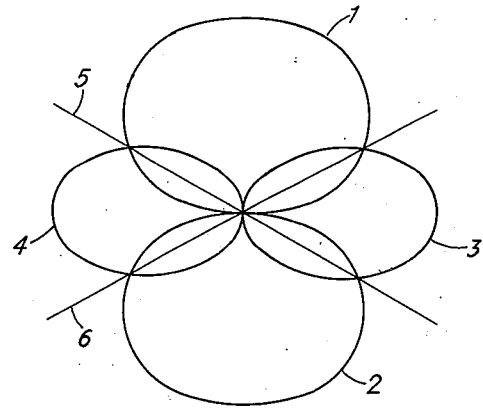

Sept. 28, 1937.  S. B. SMITH  2,094,333
RADIO BEACON SYSTEM
Filed July 26, 1935

INVENTOR.
SYDNEY BERTRAM SMITH
BY
ATTORNEY.

Patented Sept. 28, 1937

2,094,333

UNITED STATES PATENT OFFICE 2,094,333

RADIO BEACON SYSTEM

Sidney Bertram Smith, Chelmsford, England, assignor to Radio Corporation of America, a corporation of Delaware Application July 26, 1935, Serial No. 33,270
In Great Britain August 3, 1934

5 Claims. (Cl. 250—11)

This invention relates to directional wireless systems and more particularly to so-called radio beacons of the type sometimes termed the "equi-signal" type, i. e. of the type wherein different co-operating signals of "interlocking" characteristics (such as the Morse signals A and N or the Morse signals E and T) are radiated in different predetermined directions in such manner that in a given direction intermediate said predetermined directions the two interlocking signals combine to give a characteristic third signal, which, if the interlocking signals be the Morse letters A and N, for example, will be a continuous dash. At either side of this intermediate direction—which may be termed the equi-signal zone—one or other of the interlocking signals will be received and thus an aircraft or vessel equipped with a suitable radio receiver will be informed if it is situated on the equi-signal zone or if not upon which side of the equi-signal zone it is situated.

A very simple type of known equi-signal radio beacon utilizes a pair of rigid vertical loop aerials which are mutually perpendicular and are alternately excited with the two interlocking signals one of the loop aerials being excited with one signal and the other with the other.

With such an arrangement it is possible to obtain a polar diagram consisting in the simplest case of four circles of the same size, two of the circles—corresponding to the space pattern or polar diagram of one of the signals—being tangent to one another and having their centers in the same straight line with the point of contact and the two other circles—corresponding to the polar diagram for the other signal—being also tangent to one another and having their centers in a second straight line with the point of contact, this second straight line being at right angles to the first. Equi-signal zones are obtained with such a system in directions bisecting the right angles between the two mutually perpendicular straight lines just referred to. Although this known system has the virtue of great simplicity—for the antenna exciting means can be made of the simplest kind and a minimum of transmission feeders is required—the said system suffers from the important practical disadvantage that is common to practically all other known radio beacons of the loop aerial type, that is, the so-called "night effect". Accordingly beacons constructed as above described are limited as to their practical utility and during night periods they can only be used satisfactorily for short range working on medium and long waves. Further when used on wave lengths in the 100-200 meter band, such systems are also subjected to errors even during normal daylight conditions.

In order to avoid the practical limitations and disadvantages just referred to, it has been proposed to employ various arrangements of the so-called "Adcock" type comprising vertical aerials energized through shielded or balanced feeder systems and arranged to be excited with different "interlocking" signals so as to provide equi-signal zones. So far as the applicant is aware, all the known forms of Adcock equi-signal radio beacons comprise of necessity transmission lines of some length and complication and have been designed with a view towards balancing out or shielding the horizontal receptive conductive members of the system (the transmission lines) so that horizontal polarized electrical fields will not produce directional indications. Adcock equi-signal beacon systems as at present known, though considerably superior to loop aerial systems from the point of view of immunity from night effect and similar errors have accordingly, the disadvantage of being relatively expensive and complex.

The principal object of the present invention is to provide an improved radio beacon system of the equi-signal type which shall be comparable in simplicity to a loop aerial system and at the same time comparable in utility with known good quality Adcock systems.

As will be seen later, the invention provides equi-signal beacon systems with which satisfactory results can be obtained with one or two vertical aerials (though for special purposes more aerials may be used, if required) and with which it is possible to obtain substantially equal and high discrimination for a given annular displacement on either side of an equi-signal zone.

According to the present invention an equi-signal radio beacon comprises at least two vertical aerials spaced a predetermined distance apart, means for exciting said aerials in a predetermined phase relation with one of a pair of interlocking signals and means for alternating with such excitation, excitation of said aerials in a different predetermined phase relation with the other of a pair of interlocking signals, there being substantially 180° difference between the two predetermined phase relations and the whole arrangement being such that the polar diagram for the one type of excitation consists of a pair of symmetrical figures each of which is bisected by a line passing through their contact point while the polar diagram for the second type of excitation is a pair of symmetrical figures each of which is bisected by a line passing through their contact point, the two said lines being mutually perpendicular or approximately so, and the figures being such that equi-signal zones are obtained in directions between the directions of the two said lines.

Figure 2:
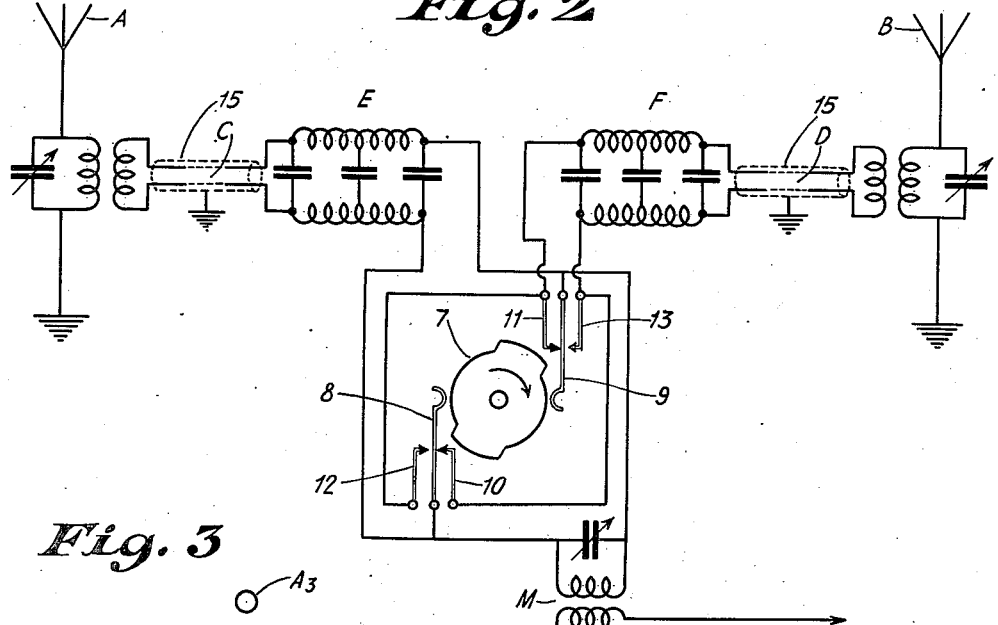
Figure 3:
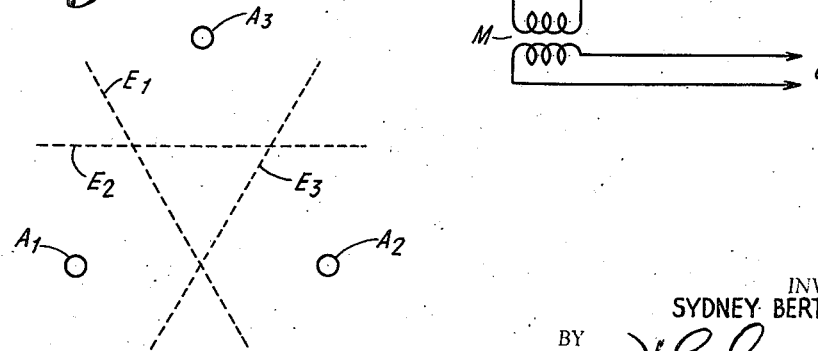

In the drawing, Figure 1 shows diagrammatically two "figure-of-eight" patterns which may be produced by directional radiation according to the invention; Fig. 2 is a circuit diagram of a transmitter illustrating the principles of my invention; and Fig. 3 illustrates a modification in which three aerials may be used.

In a preferred way of carrying out the invention an equi-signal radio beacon comprises a pair of vertical aerials spaced approximately a half wave length apart and adapted to be excited in phase for one of two interlocking signals and then in phase opposition for another of two interlocking signals. The resultant polar diagram is as shown in Fig. 1 wherein the two patterns 1 and 2 represent the polar diagram for the phase opposition type of excitation, while the two patterns 3 and 4 represent the polar diagram for the in-phase type of excitation, the equi-signal zones being represented by the straight lines 5 and 6.

Referring to Fig. 2, aerials A and B are employed. These are spaced a half wave length apart and have ordinary tuning arrangements at their bases. The aerials are adapted to be energized through feeder lines C and D, which are preferably screened as at 15 and each feeder line includes phase matching and synchronizing sections E and F as known. Carrier energy from a source G is supplied to the aerials through the mutual inductance coupling M. This energy is then impressed upon the phase matching and synchronizing section E directly and upon the corresponding section F by way of a switching device preferably operated by a continuously rotating cam 7.

The cam 7 is arranged to actuate two contact springs 8 and 9. The contact spring 8 works between companion contacts 10 and 12, while the contact spring 9 works between companion contacts 11 and 13. The portions of the cam 7 which are of greater peripheral radius and relatively short arc, transmit a single dot representing the Morse letter E, while the portions of the cam of reduced peripheral radius, but of greater length of arc, represent the Morse letter T, a single dash. In the position in which the cam 7 is shown, contacts 9, 11 are in engagement with one another, while contacts 8 and 10 are likewise in engagement with one another. In this position energy is fed to the phase matching device F in phase agreement with the energy fed to the phase matching device E. When, however, the contacts 8 and 9 are moved into their other positions upon actuation by the cam 7, the circuit connections to the phase matching device F are reversed. Hence the transmission of signaling energy from the two aerials A and B will then be in phase opposition.

This arrangement has the virtue of great simplicity. The signals are suitably interlocked with the least possible mechanism and the timing of the signals can be maintained within very close limits merely by operating the cam 7 from a continuously running motor.

Of course modifications of the cam and contact device may be made without departing from the spirit of the invention. The arrangement as shown, however, is a sufficient illustration of the principles of my invention to suggest such modifications as may be preferred.

Examination of the polar diagram of Fig. 1 will show that good and substantially equal discrimination is obtained on either side of an equi-signal zone, but that the equi-signal zones are not mutually perpendicular but at an angle of 60° and 120° to one another.

In the description of the embodiment of Fig. 2 the wave length spacing between the aerials was stated to be half the working wave length, but other arrangements are possible: for example, a slight readjustment of the spacing about the half wave length pattern will have an effect upon the rate of change of amplitude on either side of an equi-signal zone. In practice it is possible to adjust the rate of change of amplitude for small deviations on either side of an equi-signal zone, making the deviations almost identical.

If a plurality of equi-signal zones of special predetermined azimuths are required, it is possible to employ a central radiator of constant phase and by coupling reversed phase aerials as required, different desired equi-signal zones can be obtained. One simple case of this kind is diagrammatically represented in Fig. 3 wherein three aerials $A_1$, $A_2$ and $A_3$ are represented in plan view by small circles. Equi-signal zones obtainable by energizing different pairs of the three aerials are typified in Fig. 3 by broken straight lines. The lines $E_1$, $E_2$ represent equi-signal zones obtainable by energization of the aerials $A_1$, $A_3$ in phase and in phase opposition after the manner described with reference to Fig. 2 and the lines $E_1$ and $E_3$ represent equi-signal zones which are obtainable by energizing the aerials $A_1$ and $A_2$ in phase and in phase opposition as hereinbefore described. Other combinations and permutations will suggest themselves to those skilled in the art. Of course, any known suitable keying system or modulation system may be employed for effecting the required signal transmissions.

Important applications of the invention are:

(1) To short wave "Adcock" beacon transmitters with vertical or horizontal radiators.

(2) To medium wave "Adcock" beacon transmitters working on wave lengths of 100 to 200 meters where simple single equi-signal zones are sufficient, and (3) To "Adcock" beacon transmitters working on wave lengths of 800 to 1,000 meters where efficient high power beacons are required.

I claim:—

1. An equi-signal radio beacon comprising at least two vertical aerials spaced a predetermined distance apart, means for exciting said aerials in a predetermined phase relation with one of a pair of interlocking signals and means for alternating with such excitation, excitation of said aerials in a different predetermined phase relation with the other of a pair of interlocking signals, there being substantially 180° difference between the two predetermined phase relations and the whole arrangement being such that the polar diagram for the one type of excitation consists of a pair of symmetrical patterns each of which is bisected by a line passing through their contact point while the polar diagram for the second type of excitation is a pair of symmetrical patterns each of which is bisected by a line passing through their contact point, the two said lines being substantially perpendicular one to the other, and the figures being such that equi-signal zones are obtained in directions between the directions of the two said lines.

2. An equi-signal radio beacon comprising a pair of vertical aerials spaced approximately a half wave length apart, means for exciting said aerials in phase for one of two interlocking signals and then in phase opposition for another of two interlocking signals, a common high frequency source, and switching means operable when in one position to connect said aerials to said source in phase and operable when in another position to connect said aerials to said source in phase opposition, said switching means being continuously and successively operable in that manner, thus enabling said aerials to radiate in phase to send one of two interlocking signals and then in phase opposition to send the other, and so on.

3. In a radio beacon system, a source of carrier-wave signals, a plurality of antennae spaced one from another a distance substantially equal to a half wave length of said signals, means including substantially non-radiative circuits for feeding energy from said source to said antennae, a phase adjusting device in each of said circuits whereby energy may be fed to said antennae co-phasally at times and contra-phasally at times, and time-controlled switching means for repeatedly reversing the connections between said source and at least one of said phase adjusting devices, thereby to cause said antennae to radiate said signals in "figure-of-eight" patterns having different directional axes for the in-phase radiations and for the out-of-phase radiations respectively.

4. A system in accordance with claim 3 and having keying means for so timing the operation of the switching means that a dot signal is transmitted while the axis of the "figure-of-eight" pattern lies in one direction and a dash signal is transmitted while said axis lies in another direction.

5. A radio beacon comprising a plurality of at least three vertical aerials spaced apart from each other, means for exciting said aerials simultaneously in different pairs, means for varying the phase relations of the energies simultaneously applied to the respective antennae of each pair thereby to produce radiation field intensity patterns having differently oriented equi-signal zones, and timing means for varying the phase relationships between the energies respectively applied to different ones of said aerials at different moments in a signaling cycle.

SIDNEY BERTRAM SMITH.